Sept. 18, 1923.                                                1,468,065
                     H. E. WILLIAMS
               CONCRETE BLOCK MOLDING MACHINE
                  Filed Aug. 29, 1921        2 Sheets-Sheet 1
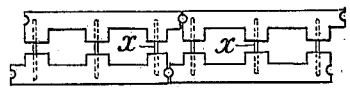
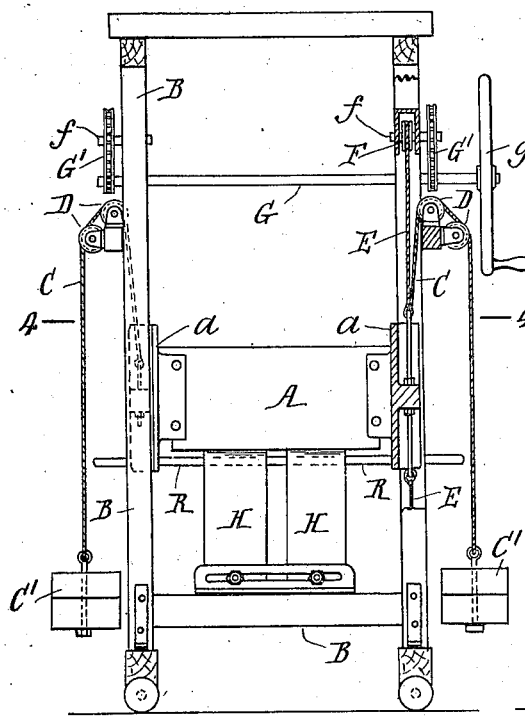
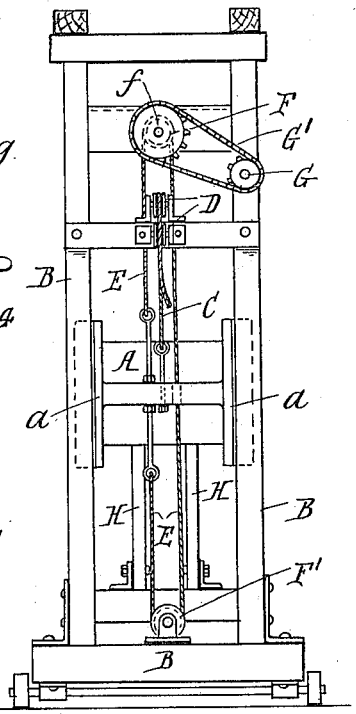
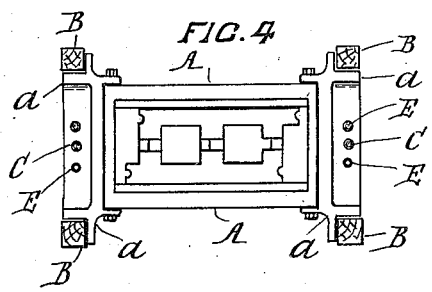

Sept. 18, 1923. 1,468,065
H. E. WILLIAMS
CONCRETE BLOCK MOLDING MACHINE
Filed Aug. 29, 1921  2 Sheets-Sheet 2
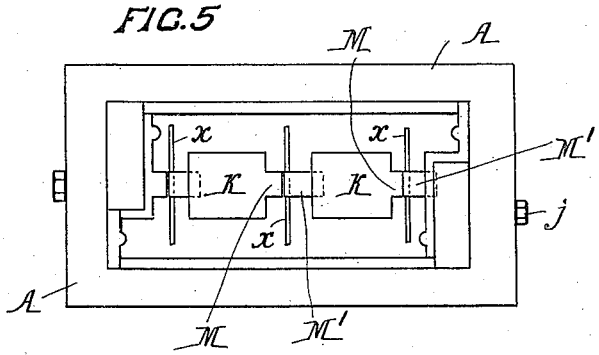
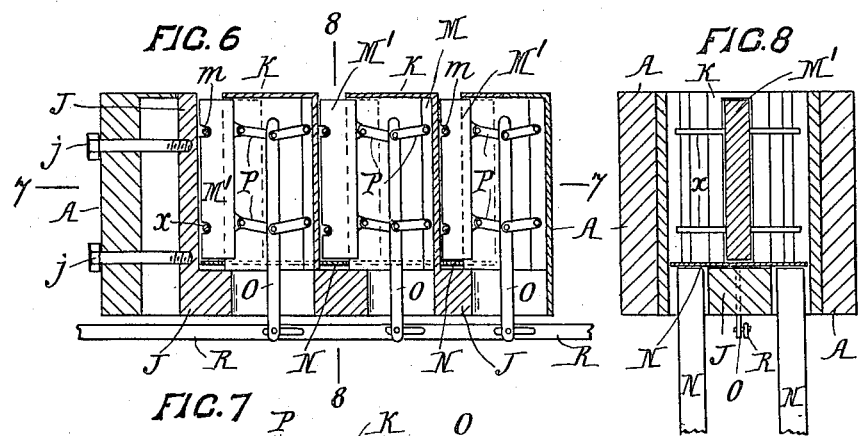
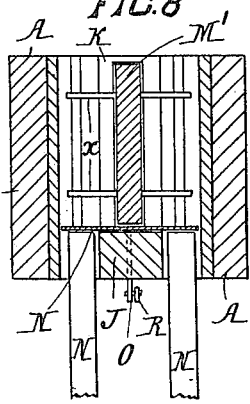
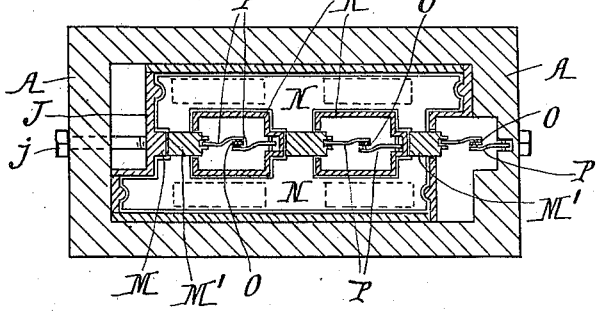
Inventor
Herbert Ernest Williams
By
B. Singer, Atty Patented Sept. 18, 1923.

1,468,065

UNITED STATES PATENT OFFICE.

HERBERT ERNEST WILLIAMS, OF AUCKLAND, NEW ZEALAND.

CONCRETE-BLOCK-MOLDING MACHINE.

Application filed August 29, 1921. Serial No. 496,516.

*To all whom it may concern:*

Be it known that I, HERBERT ERNEST WILLIAMS, subject of the King of Great Britain, residing at Dominion Road, Auckland, in the Dominion of New Zealand, have invented a new and useful Concrete-Block-Molding Machine, of which the following is a specification.

This invention relates to a machine that has been devised for use in the molding of concrete building blocks or like articles.

The construction designed provides for the article being molded within a mold having an open top and bottom that is suspended to move up and down within a supporting framework, in relation to fixed vertical pillars projecting up into the open bottom of the mold which then engage and support a false bottom for the mold formed by a pallet. When the mold is raised, the tops of these pillars support the pallet at about the bottom level of the mold so that the mold may be filled with the concrete which will therefore rest on the pallet. Then when the mold is lowered, the pillars passing relatively upwards through the mold will raise the pallet and article molded thereon clear of the top of the mold so that it may be removed on the pallet for drying and curing.

The invention in one of its features relates to the special manner of constructing and operating these parts.

The machine is suitable for the molding of building blocks in pairs or half blocks and linked together by tie wires extending transversely between them so that they may be used in the erection of cavity walls. Other features in the invention relate to special means embodied in the construction of the mould whereby these half blocks may be formed and the tie wires inserted in their places during the molding operations.

In describing the invention in its full details, it will therefore be hereinafter described in relation to such a construction and with special relation to the accompanying sheets of drawings, in which:—

Figure 1 is a plan of two of the blocks, for the molding of which the machine is designed, arranged in their relative positions to one another in the same course.

Figure 2 is a front elevaton of the complete machine, part being in section.

Figure 3 is an end elevation of the machine.

Figure 4 is a cross sectional plan of the same taken on the line 4—4 of Figure 1.

Figure 5 is a plan, on an enlarged scale, showing the mold box in condition for molding.

Figure 6 is a sectional front elevation thereof.

Figure 7 is a sectional plan taken on the line 7—7 of Figure 6.

Figure 8 is a cross sectional elevation taken on the line 8—8 of Figure 6.

In carrying out the invention, the mould box A is mounted within a framing B so that it may be able to move freely up and down within it, being provided with guides $a$ at each of its four corners that fit upon the four corresponding corner pillars of the framing. The mould box is thus maintained on the same level and is held from any lateral movement in either direction in its movements up and down in the frame.

The mould box A is counterweighted by means of flexible chain or rope connections C extending upward from each of its two ends out over pulleys D, mounted in the framing B, and then loosely down and having weights $C'$ fixed to their loose ends. These together serve to balance the mould so that it may move freely up or down.

For actuating the mould A in this manner, the means shewn in the drawings are provided. These consists in a sprocket chain E at each end of the mould that is fastened to the mould and encircles sprocket wheels F and $F'$ journalled in the frame B respectively near the top and bottom thereof. The upper F of these sprocket wheels is fixed upon a countershaft $f$ that is geared with a shaft G by the chain and sprocket or like gearing $G'$, extending across the width of the frame B, and having a hand wheel $g$ on its end for turning it. The turning of this shaft will therefore move the mould A up or down, according to the direction of turning.

Fixed in the bottom of the frame are the vertically extending pillars H. These are made of such a height that they are capable of projecting right up through the mould A when the mould is lowered to the bottom of the frame. They are made also of varying designs and suitably positioned to suit the nature of the inside shape of the mould A. In all cases however, they are adapted to support a pallet plate in a horizontal position within the mould so that when the mould has been raised to the correct height such pallet plate will form the bottom of the mould and will provide for the concrete material being poured into and supported within the mould. Then when this has set, the mould being lowered by its operating means, will cause the pillars to move upwards relatively, thereby ejecting the moulded block and holding it up clear of the top of the mould so that it may be removed on the pallet for drying. The mould may then be raised again, a fresh pallet plate inserted and the molding operation repeated and so on continuously, the machine providing for the efficient and rapid molding of the blocks or articles for which the mould is designed.

In the form of mould shewn in the drawings provision is made for the molding of a block in two separate halves having abutments extending inwards towards one another, as shewn in Figure 1. These halves are tied together by tie wires $x$ extending across between the spaces provided between the adjacent surfaces of such abutments.

The mould A therefore has a core piece of special design combined with it which extends throughout the full length of the mould and divides it into two halves, and is so constructed as to provide for the tie wires $x$ being placed in position and moulded into the double block thus formed. This core as shewn in Figures 5 to 8, is made up of a block J made to extend across the full length of the mould, at its bottom, and securely held in position by stud bolts $j$, and formed with upwardly extending pillars K at intervals apart in its length, that are made hollow, as shewn and extend upward to the top of the mould. These pillars are arranged with distances between them corresponding with the widths of the abutments to be formed on the inside faces of the half blocks. Their widths are made also such as to leave the required spaces between them and the respective sides of the mould, to form the body of the block members. In between these pillars extend fins the thickness of which corresponds with the distance between the abutments of the two half blocks of the complete block. Each of these fins is made of two parts, one of which M is fixed to or formed in one with the pillar, or the end of the mould, while the other M' is loose and is made capable of sliding bodily into the hollow of the adjacent pillar or mould end. The fins extend for the full height of the pillars, which corresponds with the height of the block to be moulded. The edge of each movable portion of the fin is notched, as at $m$, at heights corresponding with the desired positions of the tie wires $x$ so that a wire may be laid across within each notch and held thereby the engagement of the edge of such portion with the fixed portion. The lower edge of this movable portion is also disposed at a slight level above the core block J so that a pallet N may be laid within the mould, such pallet being shaped in one piece to fit wihin and cover the area enclosed between the mould casing and the fixed portions of the core, so that it extends also across the spaces left between these fixed portions. When thus the movable portions M' are withdrawn into the hollows of the core pillars, the pallet may be placed in the mould so that its cross pieces will rest on the bottom block J of the core, and the portions M' then moved out above it to complete the core. Then when the block has been moulded upon the pallet and is to be ejected from the mould along with the pallet, these movable portions are again withdrawn into the hollow core pillars, leaving the spaces above them free for the cross pieces of the pallet to pass relatively upwards during the ejecting movement.

To actuate these movable fin portions M' in the manner referred to, the special means shewn in the drawings are combined therewith. These consist for each fin, in a vertical bar O extending loosely upward in the hollow of the adjacent core pillar K, and toggle levers P pivoted to such bar and to the movable fin portion M' and the remote surface of the pillar respectively. These toggle levers are so adjusted that an upward lengthwise movement of the bar will straighten them and force the fin portion out to the required extent, while a downward draw thereon, will draw it in within the hollow of the pillar. The several bars O are then pivotally connected at their lower ends to a single cross bar R extending along beneath the mould, that may be lifted and lowered and thereby operate the bars simultaneously.

Thus in the operation of the machine, the mould is raised to its upper position, the core fin portions being in the retired positions, the pallet plate N is placed in position in the bottom of the mould, the fin portions M' are then moved out, the tie wires $x$ being placed in the notches $m$ and thus held in position, and the mould is ready to receive the concrete. After the concrete filling has set, the core fin portions M' are first retired, and the mould then lowered on to the fixed ejector pillars H which pass upwards into the mould spaces on each side of the core, and thereby engage the pallet at intervals over its whole area and support it squarely during the lowering of the mould. A clear draw is thus provided, the moulded block being left clear above the lowered mould so that it may be removed. To aid the draw of the block, the mould and core may be made with a very slight taper.

It will be readily seen that the form of mould and core may be varied at will to suit different natures and forms of articles to be moulded in the machine, the general features of construction remaining the same throughout.

I claim:—

1. In a machine for use in molding concrete blocks a mould formed by a casing and a core arranged to extend longitudinally within such casing constructed of a block fixed to the casing and having hollow pillars extending upward through the casing at intervals in the length thereof, and narrowed fin pieces extending between such pillars each formed by a fixed portion and a movable portion mounted to project from the adjacent pillar or to retire into such pillar, such movable portion having transversely extending notches at intervals in the height of its edge adjacent to the fixed portion, and means whereby it may be caused to extend from the pillar or be drawn into it, substantially as specified.

2. In a machine for use in molding concrete blocks a mould formed by a casing and a core arranged to extend longitudinally within such casing constructed of a block fixed to the casing and having hollow pillars extending upward through the casing at intervals in the length thereof, and narrowed fin pieces extending between such pillars each formed by a fixed portion and a movable portion mounted to project from the adjacent pillar or to retire into such pillar, and means, common to all of said movable fin pieces, to simultaneously operate said movable fin pieces.

In testimony whereof, I affix my signature.

HERBERT ERNEST WILLIAMS.

Witnesses:
DAVID BROWN HUTTON,
WILLIAM HENRY MCCOMBIS.